US012229526B2

United States Patent
Ghatage et al.

(10) Patent No.: US 12,229,526 B2
(45) Date of Patent: Feb. 18, 2025

(54) SMART TRANSLATION SYSTEMS

(71) Applicant: ACCENTURE GLOBAL SOLUTIONS LIMITED, Dublin (IE)

(72) Inventors: Prakash Ghatage, Bangalore (IN); Naveen Kumar Thangaraj, Salem (IN); Kaustubh Kurhekar, Pune (IN); Sreevidya Prasad, Bangalore (IN); Sriram Sankaranarayanan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 244 days.

(21) Appl. No.: 17/900,704

(22) Filed: Aug. 31, 2022

(65) Prior Publication Data
US 2023/0325613 A1 Oct. 12, 2023

(30) Foreign Application Priority Data
Apr. 9, 2022 (IN) .............................. 202211021330

(51) Int. Cl.
*G06F 40/58* (2020.01)
*G06F 16/683* (2019.01)
*G06F 40/263* (2020.01)
*G10L 15/26* (2006.01)

(52) U.S. Cl.
CPC .......... *G06F 40/58* (2020.01); *G06F 16/683* (2019.01); *G06F 40/263* (2020.01); *G10L 15/26* (2013.01)

(58) Field of Classification Search
None
See application file for complete search history.

(56) References Cited

U.S. PATENT DOCUMENTS

| | | | |
|---|---|---|---|
| 11,315,569 B1 * | 4/2022 | Talieh | H04L 12/1831 |
| 11,775,777 B2 * | 10/2023 | Fuerstenau | G06N 20/00 704/2 |
| 11,915,716 B2 * | 2/2024 | Trim | H04M 3/568 |
| 12,020,708 B2 | 6/2024 | Bradley et al. | |

(Continued)

FOREIGN PATENT DOCUMENTS

| | | | |
|---|---|---|---|
| CN | 103309854 A | * | 9/2013 |
| CN | 109033092 A | * | 12/2018 |

(Continued)

OTHER PUBLICATIONS

Nikkei personal computer No. 285, Japan, Nikkei BP, Mar. 24, 1997, pp. 315-339, with Machine English translation.

*Primary Examiner* — Shreyans A Patel
(74) *Attorney, Agent, or Firm* — Mannava & Kang, P.C.

(57) ABSTRACT

A smart translation system that translates the input content received from an application based on translation metadata and the application is disclosed. It is initially determined if a translation of the input content exists in a user cache. If it is determined that the translation of the input content exists in the user cache, the translation is retrieved from the user cache. Else, if it is determined that the translation of the input content does not exist in the user cache, the domain and language contexts of the input content are determined and an automatic translation engine is selected based on the contexts and the translation metadata. The translated content is presented to the user via the application while maintaining the look and feel of the application.

20 Claims, 16 Drawing Sheets

(56) References Cited

U.S. PATENT DOCUMENTS

| | | | |
|---|---|---|---|
| 2012/0078607 A1* | 3/2012 | Sumita | G06F 40/51 704/E11.001 |
| 2015/0347396 A1* | 12/2015 | Goldberger | G06F 9/454 704/3 |
| 2016/0078020 A1 | 3/2016 | Sumita et al. | |
| 2019/0370283 A1* | 12/2019 | Church | G06N 3/08 |
| 2020/0302126 A1 | 9/2020 | Malcangio et al. | |
| 2022/0051656 A1 | 2/2022 | Rathnam et al. | |
| 2022/0058349 A1 | 2/2022 | Yuan et al. | |
| 2023/0282205 A1 | 9/2023 | Wintrode | |

FOREIGN PATENT DOCUMENTS

| | | | | |
|---|---|---|---|---|
| JP | 2000268038 A | | 9/2000 | |
| JP | 2007052614 A | | 3/2007 | |
| WO | WO-2012010583 A1 | * | 1/2012 | G06F 17/289 |
| WO | 2021158247 A1 | | 8/2021 | |

* cited by examiner

FIG. 9A (rotated page — screenshot of SAP interface with translation panel)

Main window (902): SAP — EINGANGSRECHNUNG HINZUFÜGEN: BUCHUNGSKREIS ACC1
Toolbar: BESTELLSTRUKTUR EIN  ARBEITSVORRAT EIN  HOLD  TAKE ACTION  BLOCKCHAIN DATA  CANCEL  MEHR ⌄

VORGANG: RECHNUNG
SALDO: 0.00

Tabs: GRUNDDATEN  ZAHLUNG  DETAIL  STEUER  KONTAKTE  NOTIZ

- RECHNUNGSDATUM:
- BUCHUNGSDATUM: 09.02.2022
- BETRAG:
- STEUERBETRAG:  ☐ STEUER RECHNEN
- GSCHORT/ZUSATZ:  13( )  /
- BUCHUNGSKREIS: ACC1 ACC LIMITED JAIPUR

REFERENZ

Translation panel (904):

SCREEN TRANSLATION

- DETECTED LANGUAGE: AUTO DETECT ⌄  (908)
- TRANSLATE TO: ENGLISH ⌄  (912)
- TRANSLATION ENGINE: GOOGLE ⌄  (914)
- OCR ENGINE: AWS ⌄  (906)

🔄 RESET    △ TRANSLATE  (916)

WIKIPEDIA
HAINA BAICHAUN, WITH ITS CAPACITY AND ITS SIZE
A FREEENCYCLOPEDICA THAT EVERYONE CAN EDIT

THERE ARE 1,231,103 ENTRI
CLASSIFICATION  SUBJECT  FOR HE
GETTING STARTED  SANDBOX CONTRIBU

NEWS
RECENT CHANGES
RANDOM ENTRIES
FUNDING FOR WIKIPEDIA

HELP
HELP
THE WIKI COMMUNITY
GUIDELINES AND GUIDELINES
MUTUAL ASSISTANCE INN
KNOWLEDGE Q&A
WORD CONVERSION
IRC INSTANT CHAT
CONTACT US
ABOUT WIKIPEDIA

TOOL
CHAIN THE PAGE
RELATED CHANGES
UPLOAD THE FILE
SPECIAL PAGES

EXAMPLE ENTRY

FEBRUARY 2, 1789, VIRGINIA'S FIFTH CONGRESS CONSTITUENCY, HOLDS THE FIRST FEDERAL HOUSE OF REPRESENTATIVES ELECTION, AND IS ELECTED FOR A TWO-YEAR TERM BEGINNING WITH MARCH 4 THE SAME YEAR. THE FACT THAT THE CANDIDATES FOR THE ELECTION LATER BECAME THE PRESIDENT OF THE UNITED STATES HAS NEVER BEEN REPEATED. THE MAIN ISSUE FOR THE ELECTION WAS WHETHER THE CANDIDATE FELT HE NEEDED TO PROPOSE AN AMENDMENT (THE BILL OF RIGHTS) TO THE RECENTLY APPROVED U.S. CONSTITUTION, AND ULTIMATELY JAMES MADISON WON THE-ELECTION TO THE FIRST

NEWS
2019 CORONAVIRUS EPIDEMIC : DISEASE • VIRUSES • TEST • VACCINES • TIMELINE • GLOBAL EPIDEMICS • REACTIONS AND INFLUENCES • SUBJECT

IN THE CASE OF QUESTIONED ELECTION IRREGULARITIES, RUSSIA, THE RULING PARTY OF RUSSIA, UNITED, WON A MAJORITY IN THE 2021 STATE DUMA ELECTION (FIGURE).

THE CHINESE VARIATIONS YOU ARE USING MAY AFFECT THE EFFECT OF SOME TRADITIONAL WORD CONVERSIONS. IT IS RECOMMENDED THAT YOU SWITCH TO ONE OF THE FOLLOWING VARIANTS ACCORDING TO YOUR PREFERENCE:CONTINENTAL SIMPLIFIED,HONG KONG TRADITIONAL,MACAU TRADITIONAL,DAMA SIMPLIFIED,SINGAPORE SIMPLIFIED, TAIWAN IS A GENUINE BODY. (DON'T PROMPT AGAIN I LEARN MORE)

IDVS - SMART CONVERTER 1136

TRANSLATION — 1138

GEOFLUENT ⌄ | CHINESE ⌄ ⇄ ENGLISH ⌄ | TRANSLATE

SOURCE TEXT:

权利法案），最终詹姆斯·麦迪逊战胜詹姆斯·门罗入选首届国会的联邦众议院。弗吉尼亚州此时天寒地冻，两名候选人坚持在户外辩论，麦迪逊的面部一度在辩论过程中冻伤。麦迪逊此前曾表示没有必要制订权利法案，但竞选期间他改变立场，只坚持由国会提出修正案，而不是像门罗和亨利等反联邦党人主张的那样由各州推动宪法大会。门罗1790年当选联邦参议员，还曾在麦迪逊任总统期间任国务卿，后在1817年继任麦迪逊的总统职位。

OUTPUT TEXT:

BUT DURING THE CAMPAIGN HE CHANGED HIS POSITION, INSISTING ONLY THAT IT BE PROPOSED BY CONGRESS, RATHER THAN BY STATES PUSHING FOR CONSTITUTIONAL AMENDMENTS, AS ANTI-FEDERAL PARTS LIKE MONROE AND HENRY HAD ARGUED. THE CAMPAIGN DID NOT AFFECT THE FRIENDSHIP BETWEEN THE TWO CANDIDATES, WITH MONROE ELECTED TO THE U.S. SENATE IN 1790 AND SECRETARY OF STATE DURING MADISON'S PRESIDENCY BEFORE SUCCEEDING MADISON TO THE PRESIDENCY IN 1817.

1132

*FIG. 11C* ial Patent Application
SMART TRANSLATION SYSTEMS

PRIORITY

The present application claims priority under 35 U.S.C. 119(a)-(d) to the Indian Provisional Patent Application Serial No. 202211021330, having a filing date of Apr. 9, 2022, the disclosure of which is hereby incorporated by reference in its entirety.

BACKGROUND

Machine translation (MT) is the set of tools that enable users to input content in one language, and an automatic translation engine generates a complete translation for the input content in another target language. Machine translation tools provide translations without human editing. The most basic machine translation software operates strictly by word-for-word substitution. Some technologies can implement rule-based or statistically-modeled translations for greater accuracy. Modern machine learning (ML) includes neural networks which have ushered MT into an entirely new era. The translations produced by the modern neural network-based translation engines are gradually eliminating the gap between human and machine translations. This provides for machine-enabled translation tools that can improve human productivity.

BRIEF DESCRIPTION OF DRAWINGS

Features of the present disclosure are illustrated by way of examples shown in the following figures. In the following figures, like numerals indicate like elements, in which:

FIG. 9A shows the translation of a UI of a software application in accordance with the examples disclosed herein.

FIGS. 11A and 11B show full-page translations generated for browser-based applications in accordance with examples disclosed herein.

FIG. 11C shows a translation of a selected portion of a UI in accordance with the examples disclosed herein.

DETAILED DESCRIPTION

Figure 1:
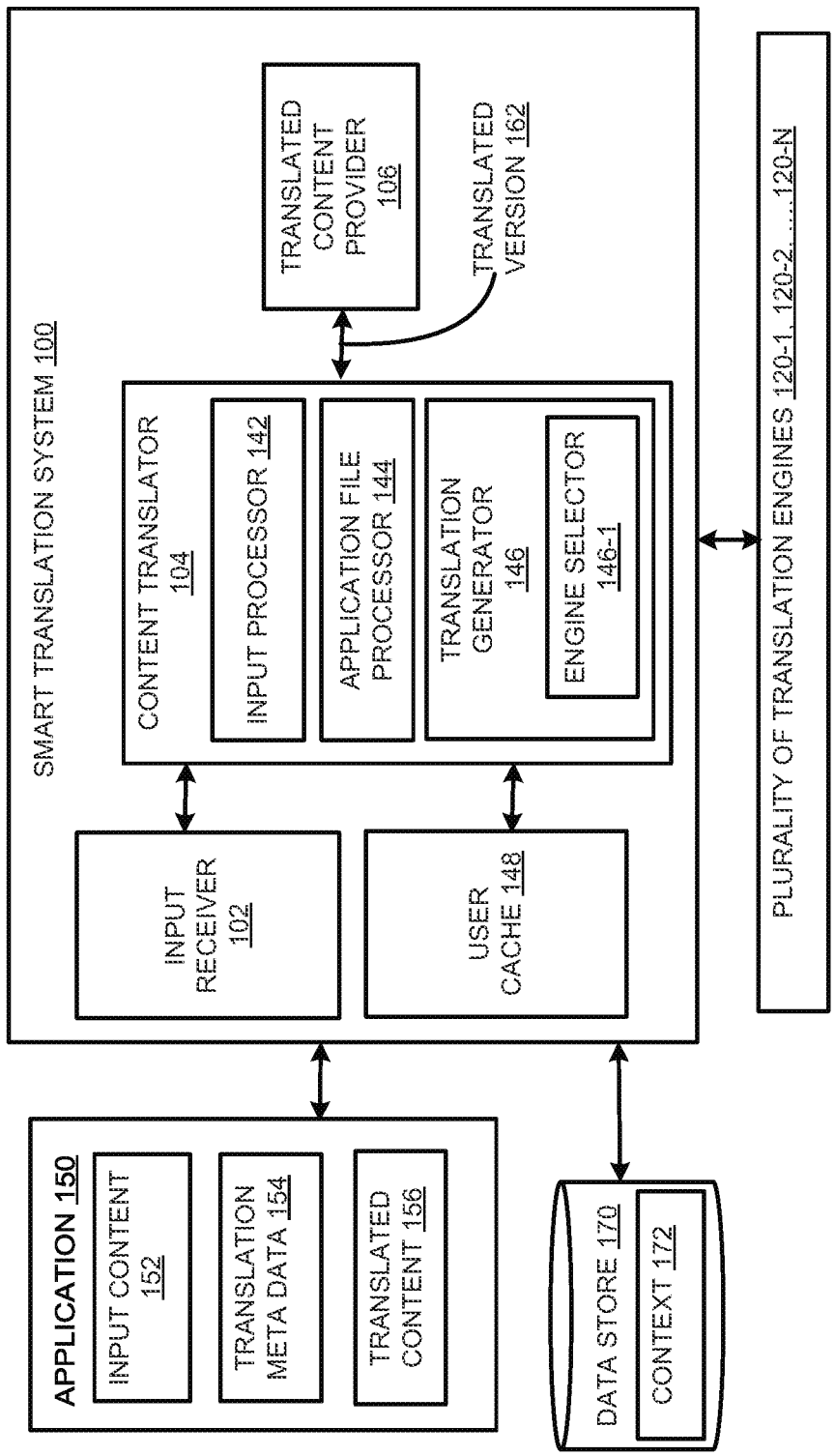
FIG. 1 shows a block diagram of a smart translation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A smart translation system that accesses input content to be translated via an application and enables the display of the translated content so that the translated content maintains the look and feel of the input content when displayed through the application is disclosed. The smart translation system extracts translation metadata including a source language of the input content and a target language into which the input content is to be translated explicitly from a user or implicitly via automatic language detection and inferred user preferences. In addition, the type of application providing the input content is determined. For example, applications providing the input content can include but are not limited to, email applications, web-based applications, software applications e.g., desktop/mobile applications, etc.

Initially, it is determined if translated content of the input content is present in a user cache and if a translation of the input content per the translation metadata exists in the user cache, the translated content is retrieved from the user cache. Else if the translated content of the input content is not stored in the user cache, the translation of the input content is obtained from a translation engine automatically or manually selected from a plurality of automatic translation engines. In an example, the plurality of translation engines can include one or more of external translation engines and translation engines that are local to the smart translation system. The smart translation system implements certain procedures before the automatic selection of the translation engine. The procedures include but are not limited to, determining a context including the domain context and a language context (e.g., the source language) of the input content. The domain context of the input content can be determined by extracting the textual content from the input content and further processing the textual content by parsing, tokenizing, and tagging the tokens with the parts of speech (POS) data. The textual content thus processed is provided to a machine learning (ML) classification model for domain context determination. Furthermore, the language context of the input content can be based on the target language and may be further determined based on domain and language-specific glossary datasets. The processed textual content is also examined for sensitive data identification and any identified sensitive data is masked/redacted before the textual content is transmitted for translation. The translation engine is automatically selected from the plurality of translation engines based at least on the context. The translated content is generated based on the type of the application and the translation metadata. In addition to generating the translations, the smart translation system is also configured to highlight key sections of the translated content in a display and to provide a summary of the translated content.

To determine if a translation of the input content exists in the user cache, the smart translation system accesses prior input content submitted by a user for translation and corresponding translated content stored in the user cache along with related translation metadata. The similarity of the input content with the prior input content is calculated. The translated content from the user cache is provided only if the similarity between the prior content and the input content exceeds a predetermined content similarity threshold.

As mentioned above, different translations can be produced for the input content based at least on the application. In an example wherein the application includes an email program, the input content can include one or more of emails and corresponding attachments. The headers and footers separating the emails are identified from the input content to be translated. In an example, one or more of the emails in the user selection can include attachments. Accordingly, the translated content generated for the user selection would contain not only translations of the emails but also translations of the email attachments. One or more of the translated emails and the original email can be stored with the original attachment and the translated attachment.

In an example, the application can include a web application executed within a web browser. Again, the input content including the user selection of at least a portion of content displayed by the web browser is received for translation. The translated content of the input content if not existing in the user cache is obtained from a selected translation engine based on the translation metadata. The translated content thus generated is displayed within the web browser. In an example, if it is determined that the user selected portion of the content displayed by the web browser includes an image of text, then the text is extracted from the image, and a translation of the text extracted from the image is also obtained.

In an example, the application can include the software application. The user can select at least a portion of the user interface (UI) of the software application for translation. Upon selection of the portion of UI, a context menu of default options for the translation metadata can be superimposed on the user selection, wherein the context menu provides default options automatically selected for the translation metadata. However, the default options for the translation metadata can be user-editable. The values of original fields including labels displayed on the portion of the user interface of the software application are initially extracted and translations of contents corresponding to each of the values are obtained. Labels including the translated contents are generated for each of the original fields. The background color of the generated labels is set to match the background of the original fields displayed on the portion of the user interface. Similarly, the font properties of the textual content can be set to match the original fields to the extent possible. The translated labels thus generated are superimposed on the original fields.

The smart translation system as disclosed herein provides a technical solution to a technical problem of generating fast, accurate automatic translations of textual content while maintaining data privacy. Accordingly, the smart translation system is configured to initially check the user cache to determine if the received input content was previously translated for given translation metadata. If yes, the smart translation system retrieves the translation from the user cache instead of accessing the automatic translation engines thereby saving time and processing resources and preventing data from being transmitted to external translation resources. Even when the input content is to be transmitted to the automatic translation engines, the input content is filtered for sensitive data which may be masked. The smart translation system also allows a user greater control over the extent of translation so that the user can select only a portion of a display for translation instead of the entire display thereby obtaining faster translations while conserving processor resources for automatic translations. Furthermore, the smart translation system is configured to handle translations of different types of content generated by different applications in a manner customized to the applications. For example, in the case of an email application, the translations can be obtained not only for the emails but also for the attachments of the emails. Similarly, translated UIs of the software applications are presented so that the look and feel of the software applications are maintained. Other functionalities, such as spelling and grammar corrections, key section identification, sentiment identification, and summary generation of the translated content are also enabled by the disclosed smart translation system.

FIG. 1 shows a block diagram of a smart translation system 100 in accordance with the examples disclosed herein. The smart translation system 100 receives input content 152 via an application 150 and provides translated content 156 corresponding to the input content 152 via a UI of the application 150 from which input content 152 was received. In different examples, the smart translation system 100 can be integrated into an application 150 as a plug-in, or the smart translation system 100 may be executed by a remote system and communicatively coupled to the application 150. In either case, the smart translation system 100 may be accessed via a UI element, such as a button or menu item on a UI of the application 150. The user may generate the input content 152 by selecting the entirety of the portion of the UI of the application 150 and triggering the smart translation system 100 for translation via activation of the UI element.

The translated content 156 is provided via the application 150 in a manner in which the look and feel of the application 150 are substantially maintained. Examples of the application 150 can include but are not limited to, an email application, a browser-based application, and a software application such as a desktop application, or a mobile application (an "app"). Different versions of the translated content 156 as detailed herein can be generated based on the application 150 via which the input content 152 is received. The smart translation system 100 includes an input receiver 102, a content translator 104, and a translated content provider 106. The input receiver 102 receives the input content 152 to be translated, along with translation metadata 154. The translation metadata 154 can include without limitation, a source language of the input content 152, the target language into which the input content 152 is to be translated, identification metadata of the application 150, and other metadata such as the file format pertaining to one or more files included in the input content 152. In an example, the smart translation system 100 is smart enough to determine that no translation is needed if the source language is the same as the target language.

The input content 152 along with the translation metadata 154 are provided to the content translator 104 which enables the generation of the translated content 156. The content translator 104 includes an input processor 142, an application file processor 144, and a translation generator 146. The input processor 142 accesses the input content 152 to determine if the translated content 156 of the input content 152 already exists in a user cache 148. In an example, users of the smart translation system 100 may have specific space on a cache e.g., the user cache 148 dedicated to storing user-specific data such as user preferences in translation engines, source/target languages, and transcription services (where applicable) and the frequently requested translations. If the translated content 156 is found in the user cache 148, then it is retrieved from the user cache 148 without the need to access external translation services such as a plurality of translation engines 120-1, 120-2, ..., 120-n. If the translated content 156 cannot be retrieved from the user cache 148, then the input content 152 may be further processed by the application file processor 144 and provided to the translation generator 146.

If the translated content 156 cannot be retrieved from the user cache 148, the input processor 142 can be further configured to determine the context 172 of the input content 152 including a domain context and a language context. In an example, the input processor 142 can be further configured for sensitive data redaction prior to sending the input content 152 to the translation generator 146 for the translation. In an example, the smart translation system 100 may be communicatively coupled to a data store 170 that stores information such as the context 172 used in the translation operations. The context 172 of the input content 152 is used by the translation generator 146 for automatically selecting one of the plurality of translation engines 120-1, 120-2, ..., 120-n (wherein n is a natural number and n=1, 2, ... ). In an example, the plurality of translation engines 120-1, 120-2, ..., 120-n can include external translation services such as but not limited to, Google Translate®, translation services provided by other cloud providers such as but not limited to AWS®, Azure®, or even local translation engines hosted by the smart translation system 100. The plurality of translation engines 120-1, 120-2, ..., 120-n may operate to provide domain-specific or language-specific translations. In an example, a user can be presented with a context menu via the application 150 which enables the user to select a specific translation engine thereby overriding the automatic selection made by the smart translation system 100. The translated version 162 output by the selected translation engine is further processed by the translated content provider 106 for presentation via the application 150.

In an example, the translation generator 146 can include an engine selector 146-1 configured to automatically select one of the plurality of translation engines 120-1, 120-2, ..., 120-n based at least on the domain/language context and the translation metadata 154. In addition, the engine selector 146-1 can receive user feedback regarding the engine selections made for prior translations. In an example, the engine selector 146-1 can implement a model-free reinforcement learning algorithm to predict the best engines for each source/target language pair and context 172. The algorithm may use the Bellman equation to compute Q-values (or Quality values). A Q-Table is first built for each language pair and context 172 combination with n rows that correspond to the number of the plurality of translation engines 120-1, 120-2, ..., 120-n, and m columns corresponding to the number of states associated with the translation engines wherein n, m are natural numbers and n, m≥1. Example states may include excellent, good, average, poor, unsupported, etc. Initially, all values of the Q-table are set to zero and the engine selector 146-1 makes random engine choices from the plurality of translation engines 120-1, 120-2, ..., 120-n. As the number of iterations increase, more accurate Q-values can be computed by the engine selector 146-1 based on the feedback from the user and hence improve in its predictions of the best translation engine for each context 172 and language pair. When a new engine is introduced or during the initial setup, the engine selector 146-1 is expected to be in its training stage. At this point, language experts and domain experts can evaluate the newly added engines in random, and provide accurate feedback before handing over the new engines to the users. The input content 152 with the sensitive data redacted is transmitted to the selected translation engine for the generation of the translated version 162.

The output from one of the input processor 142 or the translation generator 146 (depending on whether the translated content 156 was retrieved from the user cache 148 or whether the translated version 162 was generated by one of the plurality of translation engines 120-1, 120-2, ..., 120-n) is provided to the translated content provider 106 which processes the translated version 162 for display via the application 150. The translated version 162 can be further processed for post-translation refinement including spelling and grammar corrections, key section identification, summarization of translated content, etc. Furthermore, the translated version 162 can be further modified based on the language context into a form more suitable for the target language prior to being provided as the translated content 156. The translated content 156 is presented through the application 150 in a manner that maintains the look and feel of the input content 152 when displayed through the application 150. For example, a translated email corresponding to an input email can be presented/displayed in a manner that is substantially identical to the input email via the same email application from which the input email was received. Similarly, translated web content can be presented in the same web browser, and translated UIs of applications also maintain a substantially similar look and feel of the original UIs of the software application.

Figure 2:
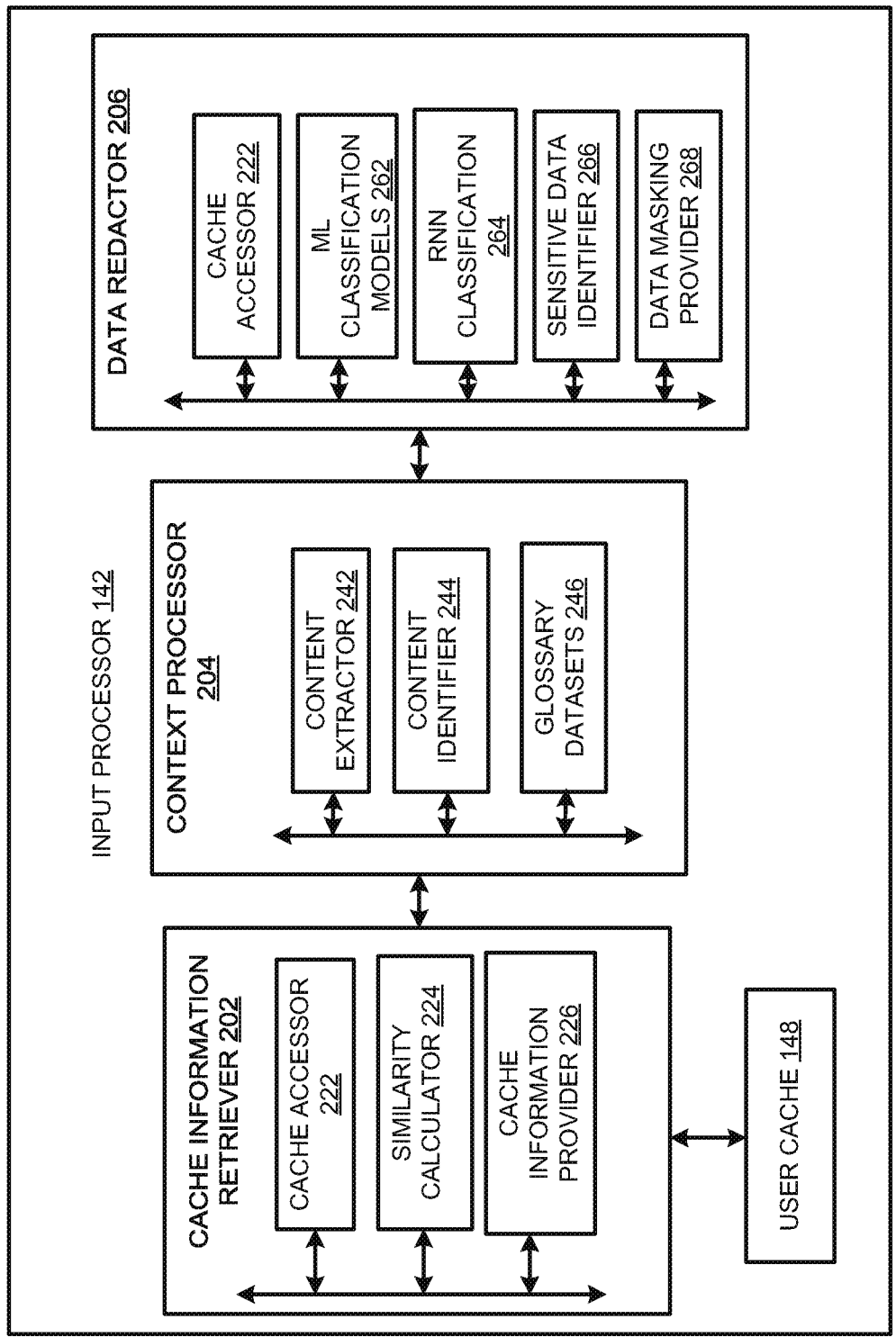
FIG. 2 shows a block diagram of an input processor in accordance with the examples disclosed herein.

FIG. 2 shows a block diagram of the input processor 142 in accordance with the examples disclosed herein. The input processor 142 includes a cache information retriever 202, a context processor 204, and a data redactor 206. When a request for translation of the input content 152 is received, the cache information retriever 202 is initially activated to determine if the requested translation was previously executed and stored in the user cache 148. Whenever a translation is generated by the smart translation system 100, it is stored in the user cache 148. In an example, the user-specific data/content may be stored in the user cache 148 for a predetermined period before expiry/deletion. Therefore, if a translation is frequently requested, it is refreshed and thereby prevented from being deleted from the user cache 148. This mitigates the need for the smart translation system 100 to access the plurality of translation engines 120-1, 120-2, ..., 120-n, for every translation request.

In an example, the cache information retriever 202 can include a cache accessor 222, a similarity calculator 224, and a cache information provider 226. The cache accessor 222 receives the input content 152 and accesses the user cache 148 to enable the determination regarding the prior translation of the input content 152 based on the translation metadata 154 which includes not only the source language/the target language but also the location/link or other identifying indicia of the application 150 including the input content 152. In an example, the name of the executable of the application 150 can be received by the smart translation system 100 and an optional parameter in the translation metadata 154. The similarity calculator 224 may calculate the similarity between the cache contents and the input content 152 including the translation metadata 154. Various similarity measures such as but not limited to cosine similarity, various distance measures, Jaccard similarity, etc., can be employed by the similarity calculator 224. The cache information provider 226 can determine if any of the contents of the user cache 148 bears a similarity greater than a predetermined content similarity threshold. If yes, then that particular content item can be returned by the cache information provider 226 as the translated version 162 of the input content 152. If no content item can be determined from the user cache 148 as having a similarity greater than the predetermined content similarity threshold, then the input content 152 is provided to the context processor 204 for context identification that enables the selection of one of the plurality of translation engines 120-1, 120-2, . . . , 120-n.

The context processor 204 includes a content extractor 242, a context identifier 244, and glossary data sets 246. The content extractor 242 can be configured to identify textual and non-textual content in the input content 152 and convert the non-textual content such as image files into textual content. For example, the input content 152 may include a selection of a portion of the webpage with image files. The image files can be processed to determine if they include text, and if so, the image files can be provided to optical character recognition (OCR) engines for conversion into textual format. The text thus obtained can be parsed, tokenized, and tagged with parts of speech (POS) by the content extractor 242 and provided to the context identifier 244. The context identifier 244 can include a machine learning (ML) classification model that classifies the textual content received in the input content 152 into the context 172 which includes one of the multiple domain/language contexts. The glossary data sets 246 can include data sets with terminologies from the different domains in different languages. For example, the glossary data sets 246 can include language-specific terminologies in English, Spanish, French, Japanese, etc., for different domains e.g., manufacturing, health care, finance, retail, education, etc. The context identifier 244 can be configured to match the word tokens provided by the content extractor 242 to the terms from the various glossary data sets 246 from domain context identification. The particular language/domain glossary data set with the highest confidence score can be output as the domain/language context of the input content 152. Identification of domain contexts enables accurate interpretation of certain terms. For example, the term 'fine' can mean that everything is okay in the healthcare domain, whereas the same term 'fine' means something very different in the finance domain. In an example, the translated version 162 generated by the selected translation engine can also be provided to the context identifier 244 for confirmation of the context initially determined for the input content 152.

Upon identifying the domain/language context of the input content 152, the tokens from the content extractor 242 can be provided to the data redactor 206 which is configured to identify and mask sensitive data. The data redactor 206 includes various ML classification models 262 for named entity recognition (NER) and entity relationship detection from the list of tuples obtained from POS tagging by the content extractor 242. A classification Recurrent Neural Network (RNN) 264 is trained to classify normal words/entities from sensitive entities representative of sensitive data that users/business entities may desire to keep private. Examples of sensitive entities can include but are not limited to individual names, addresses, contact information, and identification information, such as Social Security numbers, tax ids, financial information, account numbers, amounts, etc. Other sensitive identification techniques such as but not limited to, n-grams, inference rules, and pointwise mutual information-based approaches can also be implemented by the sensitive data identifier 266. An n-gram is a sub-sequence of n items from a given sequence. n-grams are used in various areas of statistical natural language processing and genetic sequence analysis. The items in question can be characters, words or base pairs according to the application. For example, the sequence of characters "Hatem" has a 3-gram of ("Hat", "ate", "tem", "em", . . . ), and has a 2-gram of ("Ha", "at", "te", "em", . . . ) A mutual information-based approach to fair and robust training involves Trustworthy AI in ML where, in addition to training a model that is accurate, both fair and robust training are also considered in the presence of data bias and poisoning.

The sensitive data identifier 266 can be configured to find out specific locations with the input content 152 with confidence levels higher than the predetermined confidence levels which can be indicative of the presence of sensitive information at that specific location in the input content 152. The output from the sensitive data identifier 266 can include the type of sensitive data and the location of the sensitive data within the input content 152. The data masking provider 268 receives the output of the sensitive data identifier 266 and masks, redacts, or otherwise prevents the identified sensitive data from being transmitted out to the translation engine. The data masking provider 268 can implement various data masking techniques such as but not limited to, masking by blackening the fields including sensitive data, pseudonymization i.e., replacing sensitive entities with similar data, and anonymization i.e., replacing sensitive entities with random characters.

Figure 3:
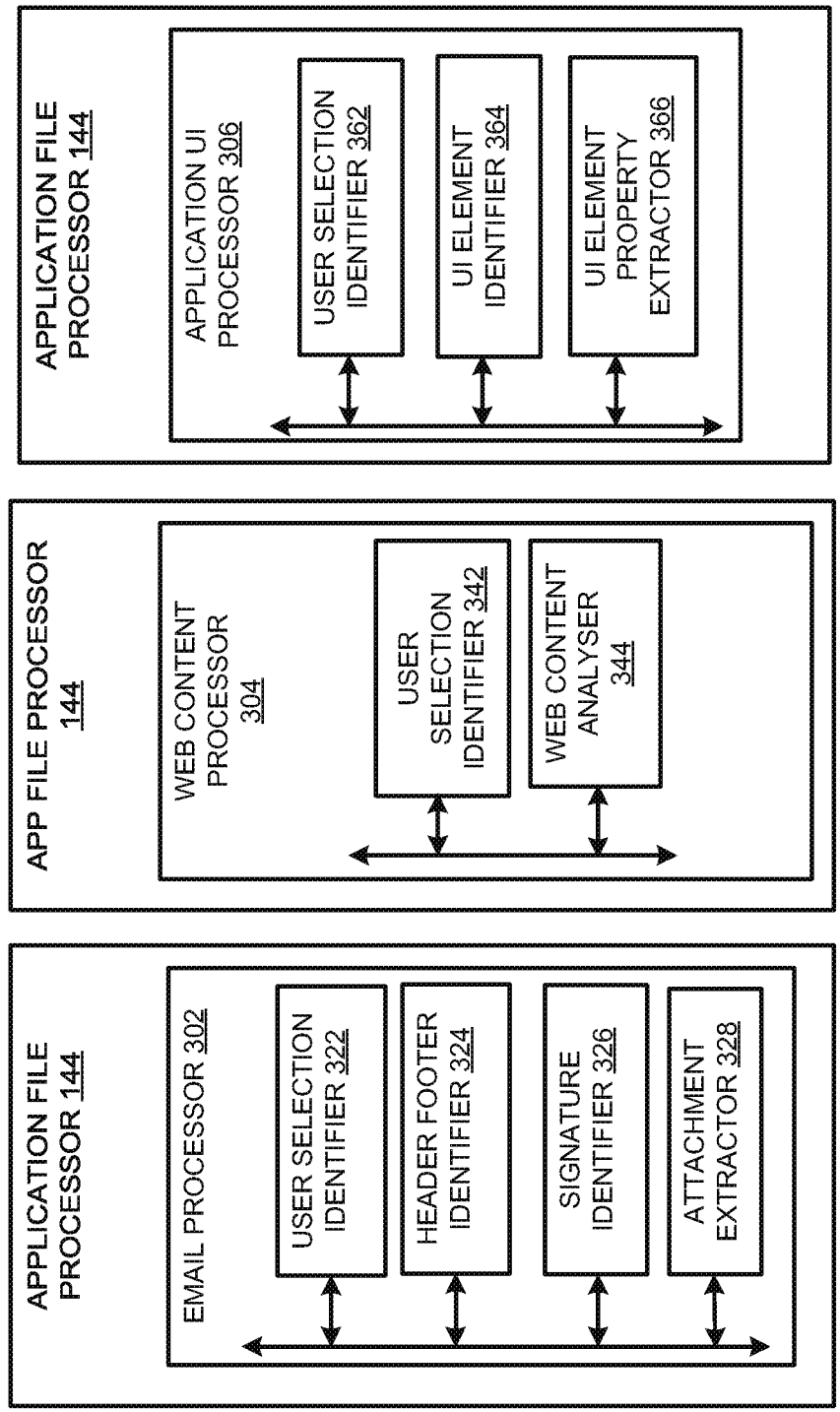
FIG. 3 shows a block diagram of an application file processor in accordance with the examples disclosed herein.

FIG. 3 shows a block diagram of the application file processor 144 in accordance with the examples disclosed herein. The input content 152 is processed for translation by the application file processor 144 based on the application 150 from which the input content 152 originates. As mentioned herein, the translation metadata 154 can include a link or other identified indicia that enables the application file processor 144 to determine if the application 150 is an email application, a web/browser-based application, or other software application. Based on the identified indicia, the application file processor 144 can include one of an email processor 302, a web content processor 304, and an application UI processor 306.

When the application 150 is an email program, the application file processor 144 includes the email processor 302 which allows the user to select one or more emails from an email chain or portion of an email for translation. As mentioned above, the user may identify the input content to be translated via a selection operation such as a mouse click, a hold and release operation, etc. A mouse click event can be fired indicating the user selected region and the smart translation system 100 can be triggered via a pop-up menu, a button, or another UI widget. The input content 152 thus received or identified by the user is provided to the email processor 302 for preprocessing prior to translation. In an example, the email processor 302 can include a user selection identifier 322, a header-footer identifier 324, a signature identifier 326, and an attachment extractor 328. The user selection identifier 322 may identify the input content 152 based on the selection operation. The input content 152 for an email application can include a current email, a complete email chain of multiple emails, a specific portion of an email/email chain, etc. The header-footer identifier 324 implements a classification support vector machine (SVM) algorithm to identify header and footer sections of emails.

The header section of an email can include information related to the sender, the recipients, the time/date the email was sent or received, the subject of the email, and any attachments the email may have included. The footer section of the email can include the signature of the email sender. In case, a chain of emails is to be processed, the headers and footers enable individual identification of each of the emails in the email chain. Again, the output including the word tokens and the POS tags of the content extractor 242 can be used for grouping features. The features used by the SVM model for the header/footer identification can include but are not limited to, the position of the words, images, or data structures in the file containing the input content 152, the number of words, named entities such as persons' names, addresses, phone numbers, logos, special patterns, line breaks, etc. The signature identifier 326 can also use the above-mentioned features for identifying email signatures. When an email is submitted for translation, the email signatures may not be translated in some examples. The attachment extractor 328 can also include an ML model trained to identify attachments from email headers. In an example, the attachments thus obtained may be provided as part of the input content 152 that is submitted for translation. In an example, the translated attachments can be put back into the original emails during replies or forwards. Therefore, the original email after translation may include two attachments, the original attachment in the source language and the translated attachment in the target language. In an example, the translated email may be stored in the email server along with the original and the translated attachments.

When the application 150 includes a web application, or a web browser, the application file processor 144 may include a web content processor 304 which may further include a user selection identifier 342 and a web content analyzer 344. The user selection identifier 342 can function similarly to the user selection identifier 322 for an email application wherein, the user selection identifier 342 identifies the user-selected portion of content from a web browser. The web content analyzer 344 analyzes the input content 152 to determine the translation metadata 154 such as automatically detecting the source language of the webpage content if not readily available in the translation metadata 154.

The application UI processor 306 also includes a user selection identifier 362, a UI element identifier 364, and a UI element property extractor 366. The user selection identifier 362 receives the UI or the portion of the UI selected by the user as the input content 152. The UI element identifier 364 identifies UI elements such as labels, buttons, combo boxes, etc. within the user-selected portion of the UI. The UI element property extractor 366 extracts the position coordinates of the UI elements along with properties such as the size, background color, foreground/text color, font size, font type, etc. within the UI from which the input content 152 is received. The UI element position information enables the smart translation system 100 to superimpose the translated labels, names, etc., at the positions of the original labels so that the look and feel of the application UI are maintained.

Figure 4:
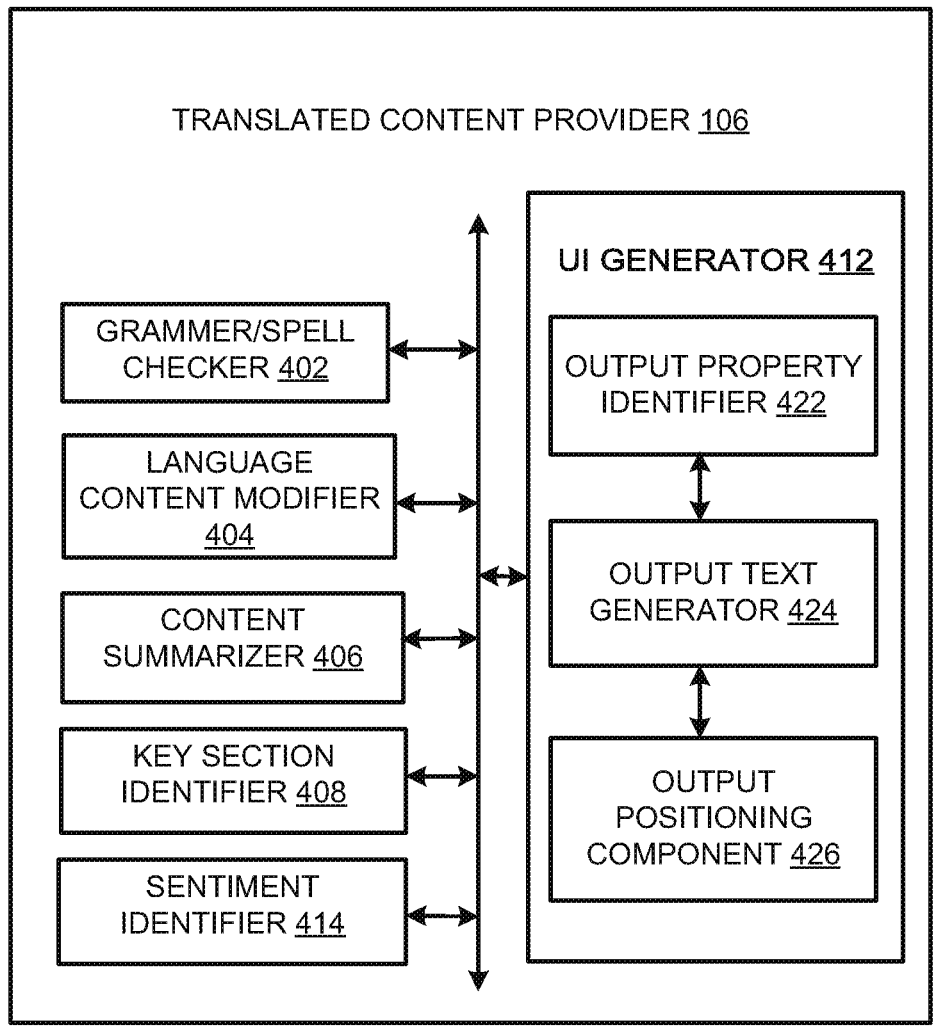
FIG. 4 shows a block diagram of a translated content generator in accordance with the examples disclosed herein.

FIG. 4 shows a block diagram of the translated content provider 106 in accordance with the examples disclosed herein. The translated content generator includes a grammar/spelling checker 402, a language context modifier 404, a content summarizer 406, a key section identifier 408, a sentiment identifier 414, and a UI generator 412. It may be appreciated that not all components of the translated content provider 106 need to be employed for generating the translated content 156. Rather, one or more of the components may be used depending on the application 150 for which the translated content is to be generated. For example, if the application 150 is an email program, components including the UI generator 410, the grammar/spelling checker 402, and the language context modifier 404 may be used while the contents summarizer 406 and the key section identifier 408 may not be used. On the other hand, if the application 150 is a webpage, the contents summarizer 406 and the section identifier 408 may be used while the UI generator 410 or the language context modifier 404 may not be employed.

The grammar/spelling checker 402 provides for detecting grammatical errors and spelling mistakes in the translated version 162 using natural language processing (NLP) techniques. For example, grammatical mistakes based on tenses or those mistakes based on references can be identified and corrected. Similarly, using the language/domain glossaries, spelling mistakes can also be corrected by the grammar/spelling checker 402. An example of a dictionary-based correction can address a simple spelling error wherein 'I acept this proposal' is corrected to 'I accept this proposal. Context-based spelling errors may also be corrected. For example, an input sentence 'I accept this to be done by 3 pm' may be corrected as 'I expect this to be done by 3 pm'.

Each language has its way of representing text while it is been spoken or written. For example, polite speech in Japanese requires that a person be addressed with a name in combination with 'SAN', e.g. 'John San'. The language context modifier 404, accommodates such language peculiarities by extracting the translated version 162 and further adding/replacing translated words/sentences with language context. Using NLP techniques, the words to be modified/replaced are identified and words from the language/domain glossary datasets are used and the sentences are generated with Natural Language Generation (NLG) techniques. This can be very useful while translating email communications.

The content summarizer 406 is configured to read the translated version 162 by implementing NLP techniques to interpret and summarize the data. For example, if the input content 152 is a long contract document, the contents summarizer 406 can summarize key points, such as the parties involved, the contract start date, the milestones to be achieved, and the termination date of the contract, etc. In an example, the content summarizer 406 can generate content summary by extracting and isolating key information from a pre-existing text, and compressing the text into summarized content.

The key section identifier 408 processes the translated version 162 to highlight the key points in the translated content 156. The key section identifier 408 can implement an ML classification model trained to identify key/non-key sections. Features such as but not limited to, the position of words, whether the word is positive or negative, number of words in the position, person name, ending characters, special patterns, number of line breaks, etc., can be used by the ML classification model to differentiate the key sections from the non-key sections. A sentiment identifier 414 is also included in the smart translation system 100 for detecting the sentiment expressed in the input content 152. In an example, a Convolutional Neural Network (CNN) classification model to detect the sentiment or emotion. A separate CNN model can be built for each language. The sentiment can be differentiated at different levels. For example, the nature of the sentiment e.g., whether negative or neutral can be detected. The intensity of the sentiment may also be detected as threat/urgency/high, medium, or low. Similarly, other contexts associated with the sentiment may also be identified. For example, based on the sentiment, a sentence may be identified as a request a query, or an answer.

The UI generator 412 can be used to generate and present the translated content 156 through the application 150 so that the look and feel of the application 150 are maintained. Therefore, when viewed in an email program, the translated email maintains the look and feel of the original email. Similarly, a translated UI screen of a software utility or other software program maintains the same appearance as the original UI screen albeit that the content is displayed in the target language instead of the source language. In order to achieve a substantially similar look and feel, the UI generator 412 is configured with an output property identifier 422, an output text generator 424, and an output positioning component 426. As the smart translation system 100 operates as a plugin, the display properties of the UIs of the application 150 may be accessed via the application programming interfaces (APIs) by the output property identifier 422. Display properties may include but are not limited to, the background color of the UI screen(s), font type, font face, font color, other font properties, positioning of specific words on the UI(s), etc. The output text generator 424 generates output text using the display properties and the output positioning component 426 places the text modified per the display properties at positions determined by the position coordinates of the corresponding text in the original UI from which the input content 152 was extracted.

Figure 5:
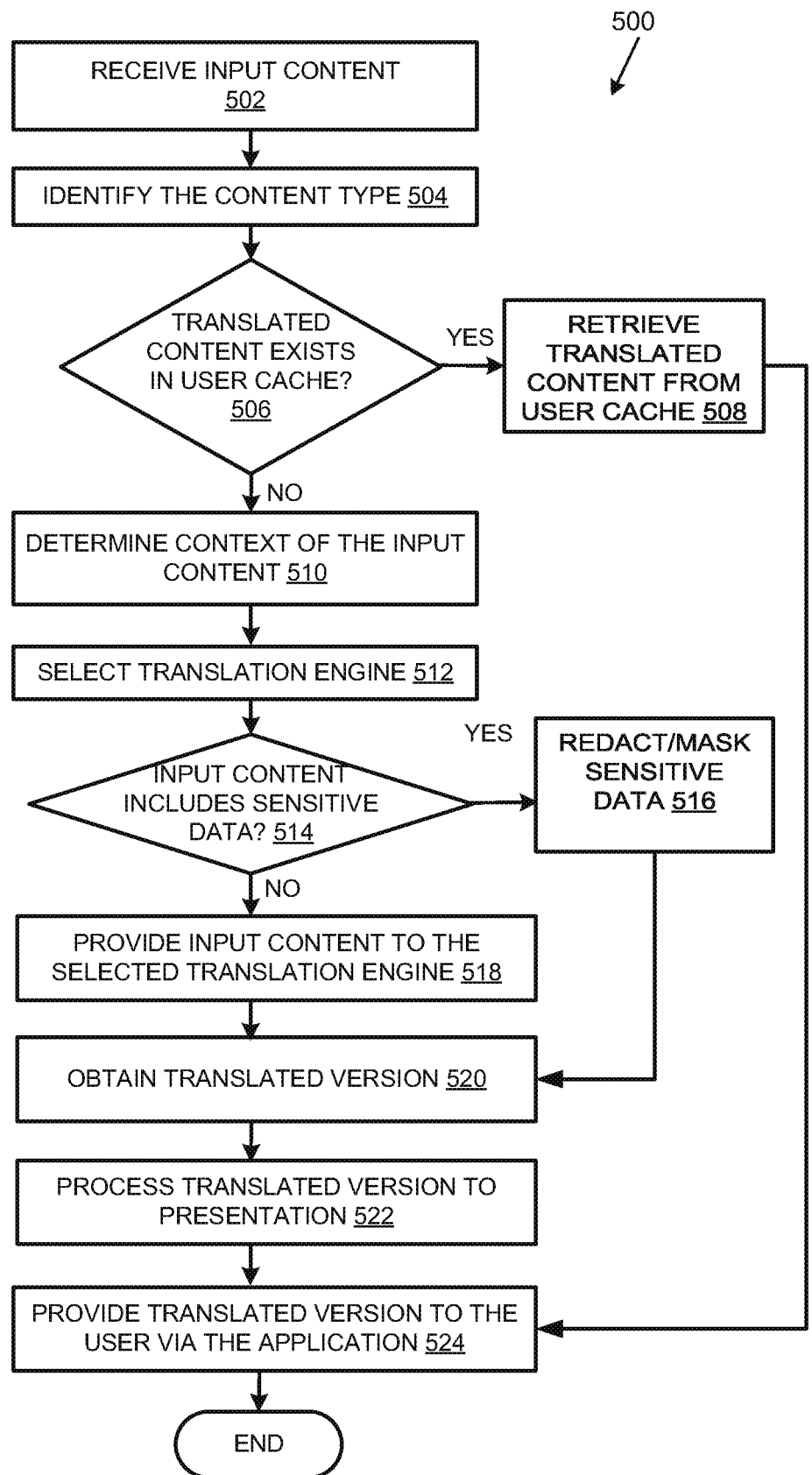
FIG. 5 shows a flowchart of a method of translating input content in accordance with the examples disclosed herein.

FIG. 5 shows a flowchart 500 that details a method of translating the input content 152 in accordance with the examples disclosed herein. The method begins at 502 wherein the input content 152 is received from the application 150. As mentioned herein, a user can select the entirety or a portion of the UI of the application 150 for translation which can be conveyed to the smart translation system 100 as the input content 152. The translation metadata 154 can also be received along with the input content 152. The translation metadata 154 can include at least a source language of the input content 152 and the target language into which the input content 152 is to be translated. At 504, the content type can be identified from the translation metadata 154, i.e., it can be determined, if the input content 152 is web content, an email, or a portion of the user interface of a software application. At 506, it is determined if the requested translation of the input content 156 already exists in the user cache 148. For example, if a user frequently requests the same translation for a particular content piece, e.g., the same webpage to be translated into the same language, then such translation may be stored in a user-specific portion of a cache i.e., the user cache 148. If it is determined at 506 that the requested translation exists in the user cache 148, then the translation is retrieved at 508 from the user cache 148 and provided to the user via the application 150 at 524.

It is determined at 506 that the requested translation is not stored in the user cache 148, then the method proceeds to 510 to determine the context of the input content 152. Based at least on the context and the translation metadata 154, a translation engine is selected from the plurality of translation engines 120-1, 120-2, . . . , 120-n at 512 for generating the translated version 162 of the input content 152. It is further determined at 514 if the input content 152 includes any sensitive data. If yes, the sensitive data is redacted/masked at 516 and the input content 152 with the sensitive data masked, is provided to the selected translation engine at 518. The translated version 162 is obtained from the selected translation engine at 520. The translated version 162 is further processed for presentation at 522 through spelling and grammar checks, language context modifications, summarization, key section, and sentiment identification and/or suitable UI generation. At 524, the translated content 156 thus generated from further processing of the translated version 162 is provided to the user via the application 150.

Figure 6:
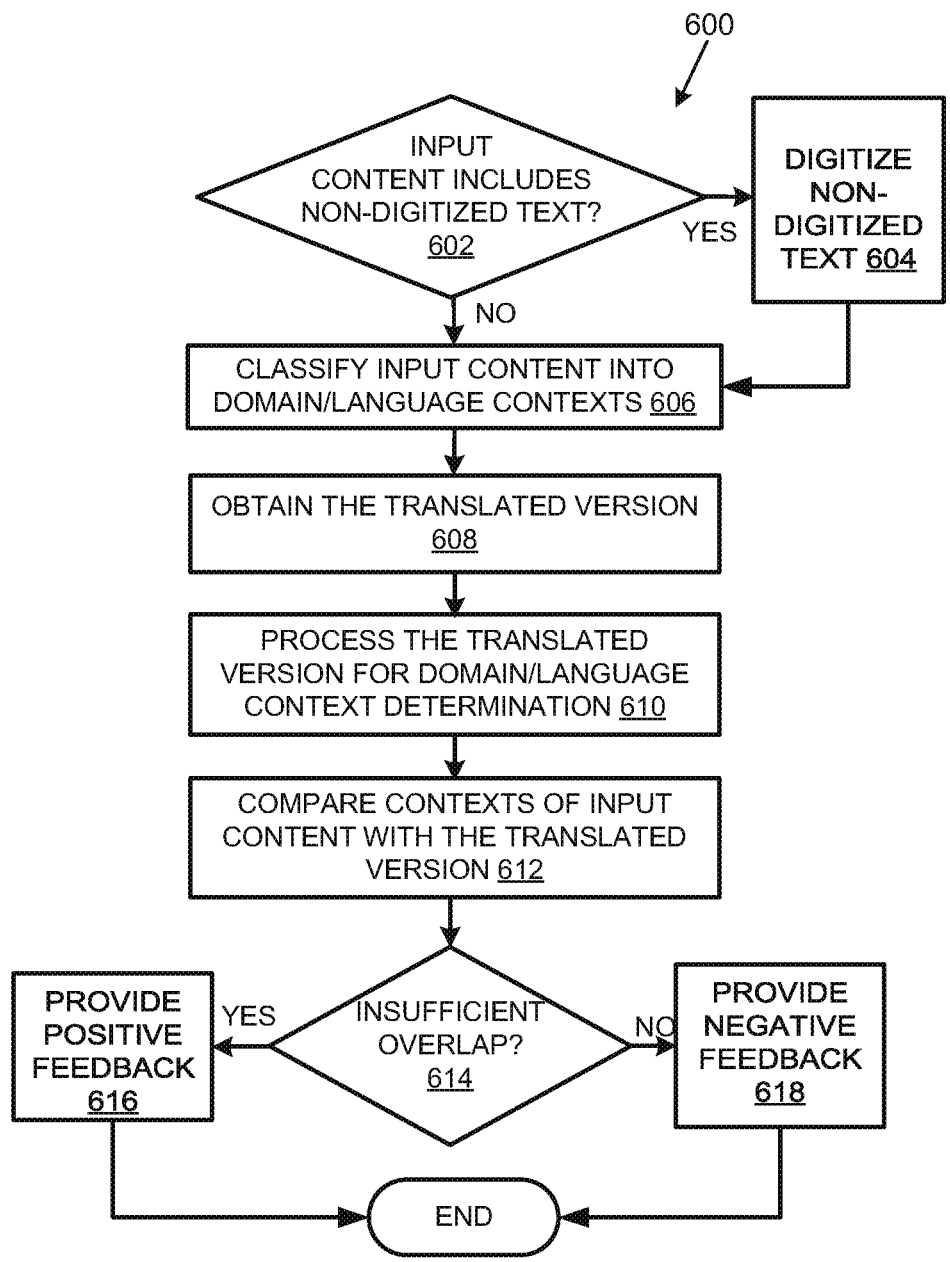
FIG. 6 shows a flowchart of a method of determining the context of the input content in accordance with the examples disclosed herein.

FIG. 6 shows a flowchart 600 that details a method of determining the context of the input content 152 in accordance with the examples disclosed herein. The method begins at 602 wherein it is determined if the input content includes non-digitized text. For example, the input content 152 can include scanned or other kinds of images which may include text. If it is determined at 602 that the input 152 includes non-digitized text, then the method proceeds to 604 to digitize the non-digitized text, for example by OCR, and the method proceeds to 606. If it is determined at 602 that the input content 152 includes digitized text, the method proceeds to 606 directly to classify the input content 152 into specific domain and language contexts. Based at least on the determined context and the translation metadata 154 the translated version 162 is obtained at 608. At 610, the translated version 162 is again processed for domain and language context determination. The domain and language contexts of the input content 152 are compared to those of the translated version 162 at 612. Based on the comparison at 612, it is determined at 614 if there is sufficient overlap between the contexts of the input content 152 and the translated version 162. If yes, positive feedback is given at 616 for context determination else negative feedback is given at 618 for context determination.

Figure 7:
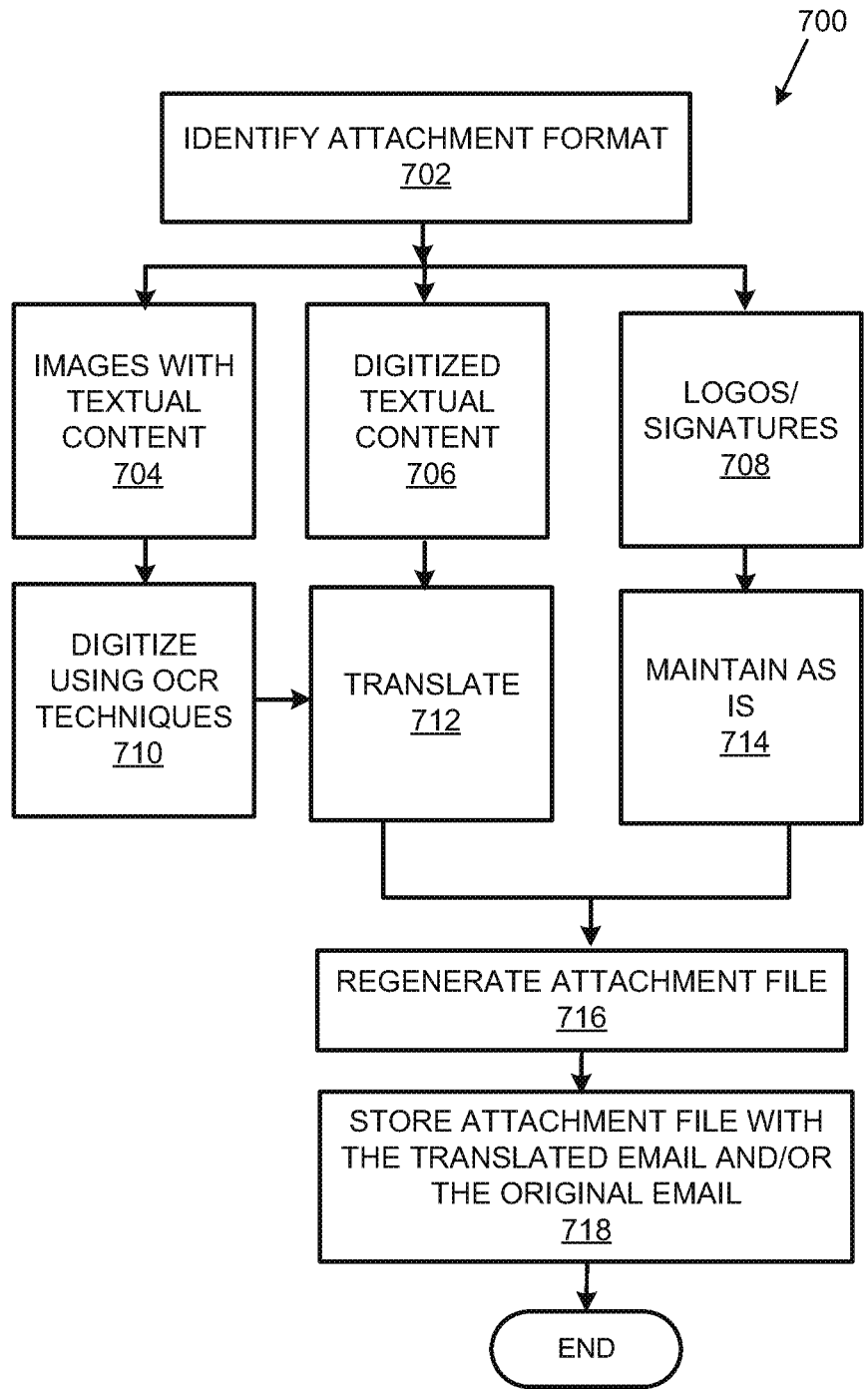
FIG. 7 shows a flowchart for a method of generating translated email attachments in accordance with the examples disclosed herein.

FIG. 7 shows a flowchart 700 that details a method of generating translated email attachments in accordance with the examples disclosed herein. At 702 the format of the attachment along with the source and target languages are determined. While the source language can be provided explicitly by the user in the translation metadata 154, it can also be automatically determined using trained ML classification models which are trained to identify different languages. The file format of the attachment can be determined from the file metadata. The attachment can include files of different formats such as images including the textual content 704, digitized textual content 706, and logos/signatures 708. Images with textual content 704 are digitized using OCR techniques at 710 and translated into the target language at 712. The digitized textual content 706 can be directly translated into the target language at 712. In an example, the logos/signatures 708 are maintained in the source language as-is without translation at 714. The attachment file is regenerated at 716 in the target language. In an example, the attachment file can be generated by replacing the content in the original attachment file with the translated content. At 718, the attachment file is included in one or more of the translated email and the original email and stored on the email server hosting the application 150.

Figure 8:
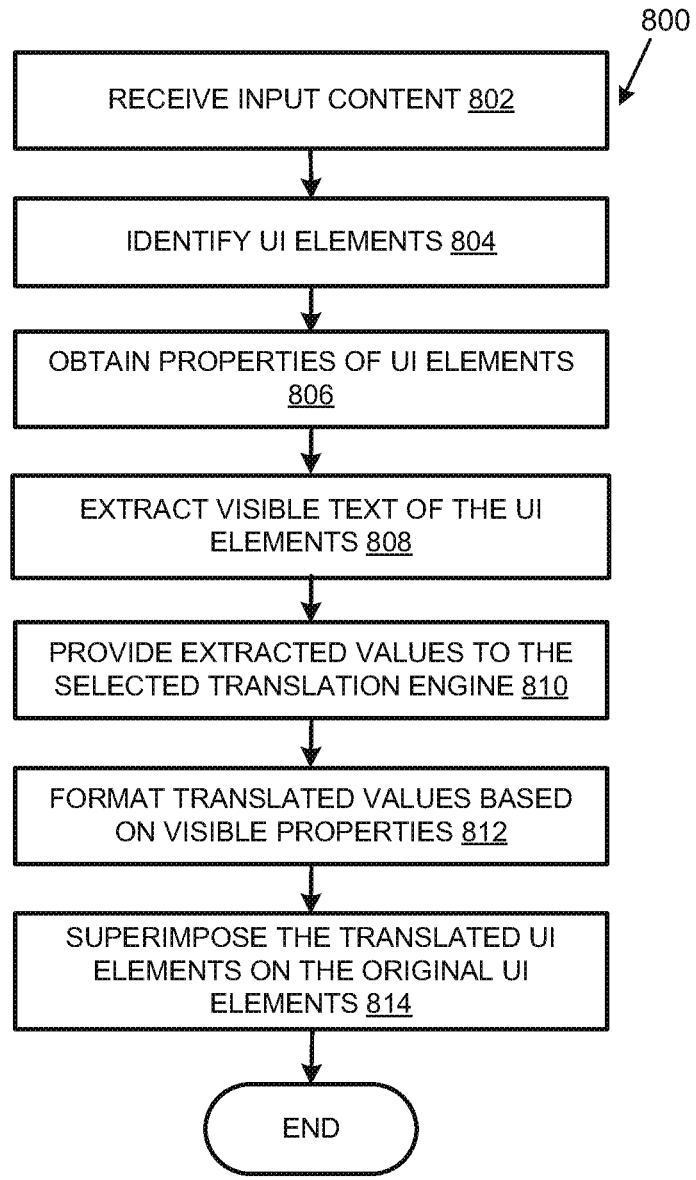
FIG. 8 shows a flowchart of a method of generating a translated user interface (UI) in accordance with the examples disclosed herein.

FIG. 8 shows a flowchart 800 of a method of generating a translated UI that maintains the look and feel of the original UI in accordance with the examples disclosed herein. The method begins at 802 wherein the input content 152 including the user-selected portion of the UI is received. At 804, the UI elements from the user-selected portion of the UI are identified. In an example, the information regarding the UI elements can be obtained using the APIs of the application 150. At 806, the properties of the UI elements e.g., visible attributes, values, placements on the UI, etc., can also be obtained using the APIs, or by accessing markups in case of web applications, etc. At 808, the visible text of the UI elements that is to be translated is extracted. For example, in the case of labels, the values displayed on the labels are extracted. Similarly, for drop-down menus or combo boxes, the values visible to the user are extracted. The extracted values may be filtered for sensitive data and provided to the selected translation engine at 810. The translated values obtained from the selected translation engine can be formatted in accordance with the visible properties of the UI elements at 812. The visible properties may include background color, font properties such as font type, font size, font style, etc. The translated UI is generated at 814 by superimposing the translated UI elements over the corresponding original UI elements so that the translated UI elements occlude the original UI elements.

Figure 9A:
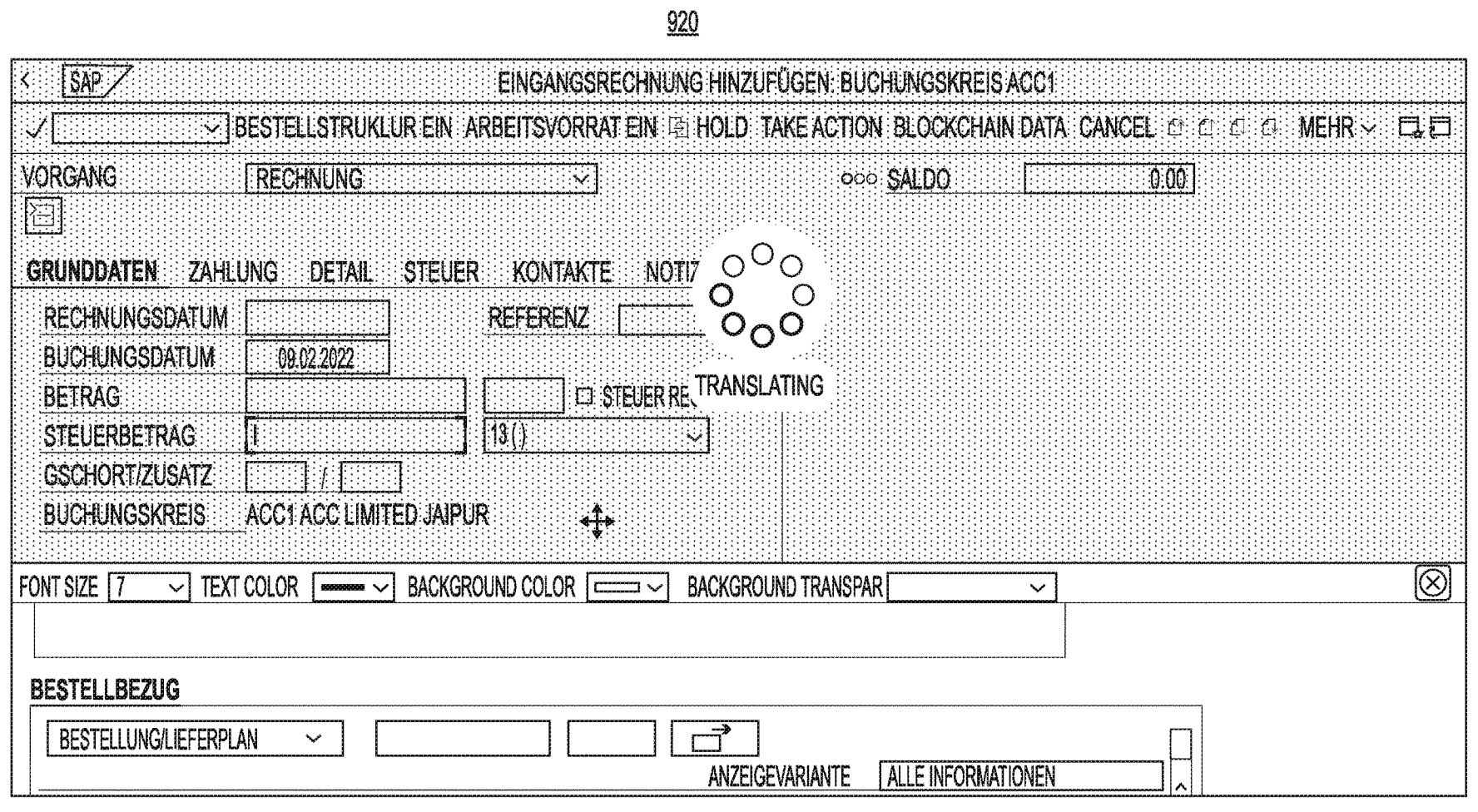

FIG. 9A shows the translation of a UI of a software application in accordance with the examples disclosed herein. The source language of an initial UI 902 is German. However, when a portion of the UI or when the entire UI is selected for translation, a context menu 904 for screen translation may pop up showing the default options for the translation selected by the smart translation system 100, and enabling the user to change the default options. The default options may include an automatically detected language 908, the target language 912, the translation engine 914 and an OCR engine 916 to be used for the translation. On making satisfactory choices, the user may click the translation option 916 to initiate the translation of the UI 902 as shown at UI 920.

Figure 9B:
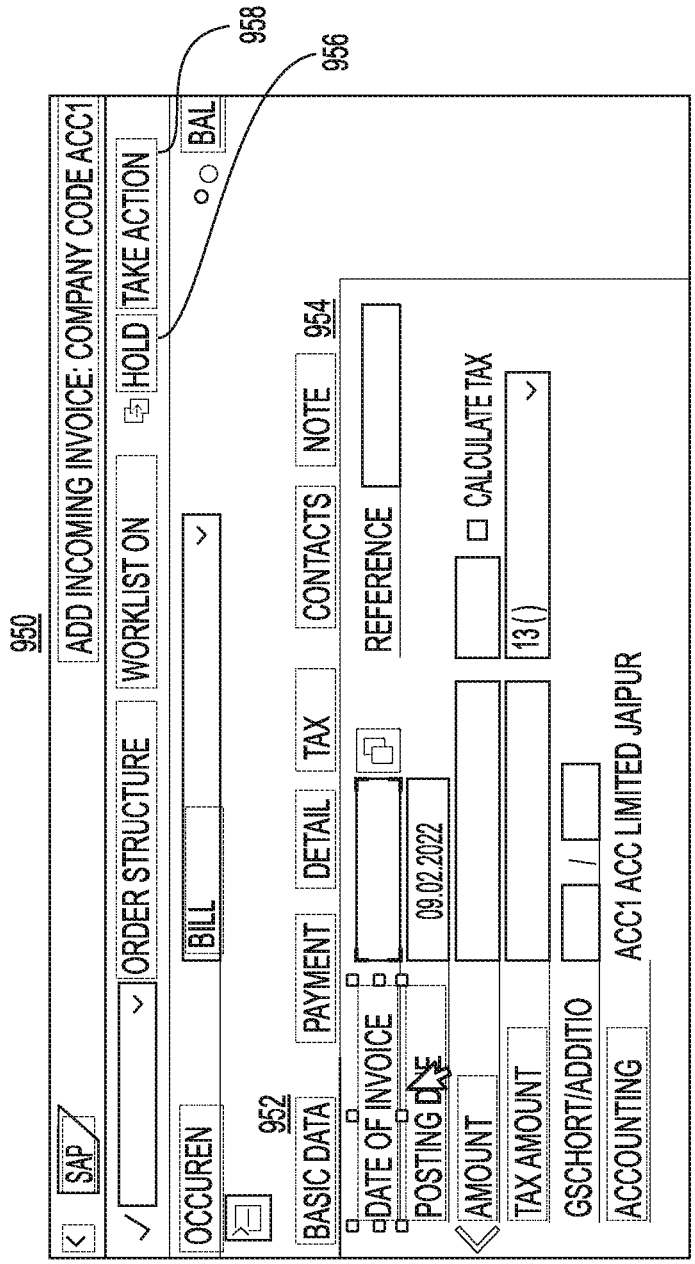
FIG. 9B shows the translated UI generated based on various options in accordance with the examples disclosed herein.

FIG. 9B shows the translated UI 950 generated based on the options as shown in the UI 902 in accordance with the examples disclosed herein. As seen in the translated UI 950, the various labels 952, 954, and buttons 956, 958 are translated into English which is the target language selected at 912. As seen from the translated UI 950, the look and feel of the UI 902 are maintained even after translation so that the user does not have to contend with an unfamiliar UI post-translation.

Figure 10:
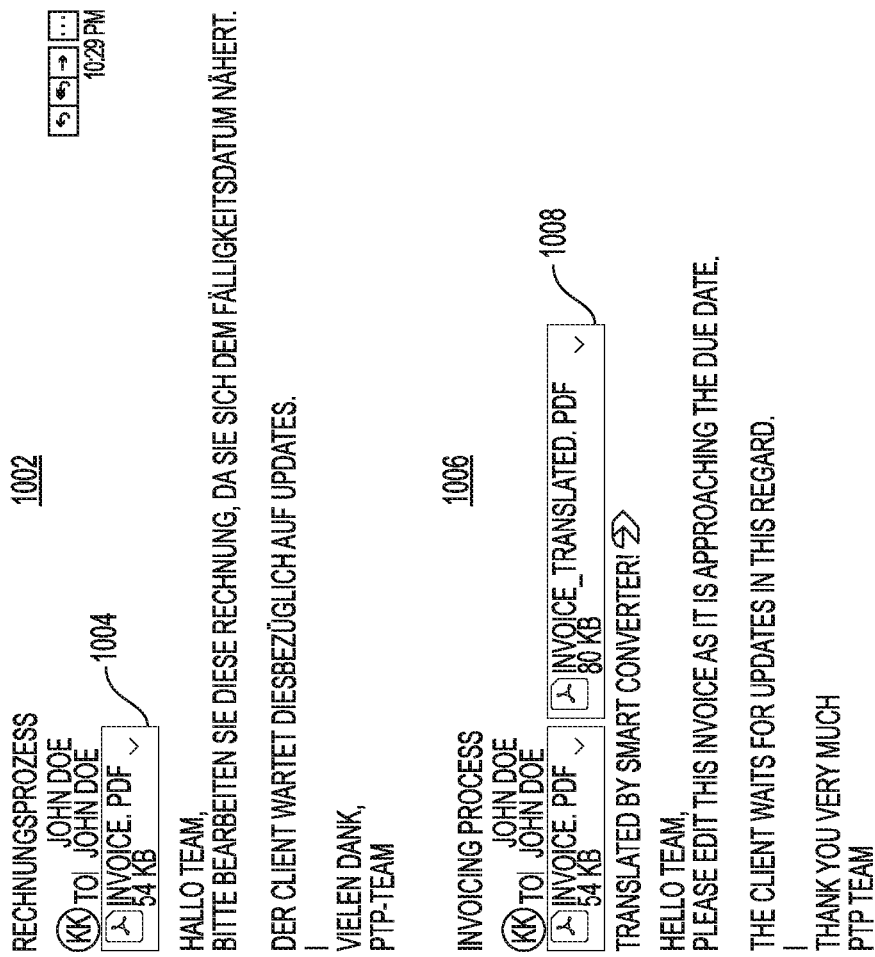
FIG. 10 shows the functioning of the smart translation system in an email application in accordance with the examples disclosed herein.

FIG. 10 shows the functioning of the smart translation system 100 in an email application in accordance with the examples disclosed herein. The initial email 1002 is in a source language e.g., German with an attachment 1004 which is also in the source language. Based on user options a translated email 1006 is generated. However, the translated email has two attachments, the original attachment 1004 and a translated attachment 1008 which is a translation of the original attachment 1004 into the target language. In an example, the initial email 1002 may be stored by both the attachments 1004 and 1006 depending on the user options.

Figure 11A:
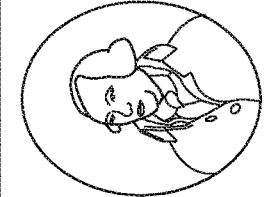

FIGS. 11A and 11B show full-page translations when applied for browser-based applications by the smart translation system 100 in accordance with examples disclosed herein. In particular, FIG. 11A shows an initial webpage 1110 in Chinese which is the source language while FIG. 11B shows the translated webpage 1120 in English which is the target language. In an example, the translated webpage 1120 may include certain suggestions 1122 from the smart translation system 100 for specific language dialects encountered during the translation.

FIG. 11C shows the translation of a selected portion of a UI 1130 in accordance with the examples disclosed herein. The translation 1132 of the selected portion 1134 is shown in an overlay 1136 on the UI. In an example, the overlay 1136 generated by the smart translation system 100 can include the selected portion as the source text and the translation 1132 as the output text. The overlay 1136 also includes various translation options 1138 which may default to system-selected values that a user may override if needed.

Figure 12:
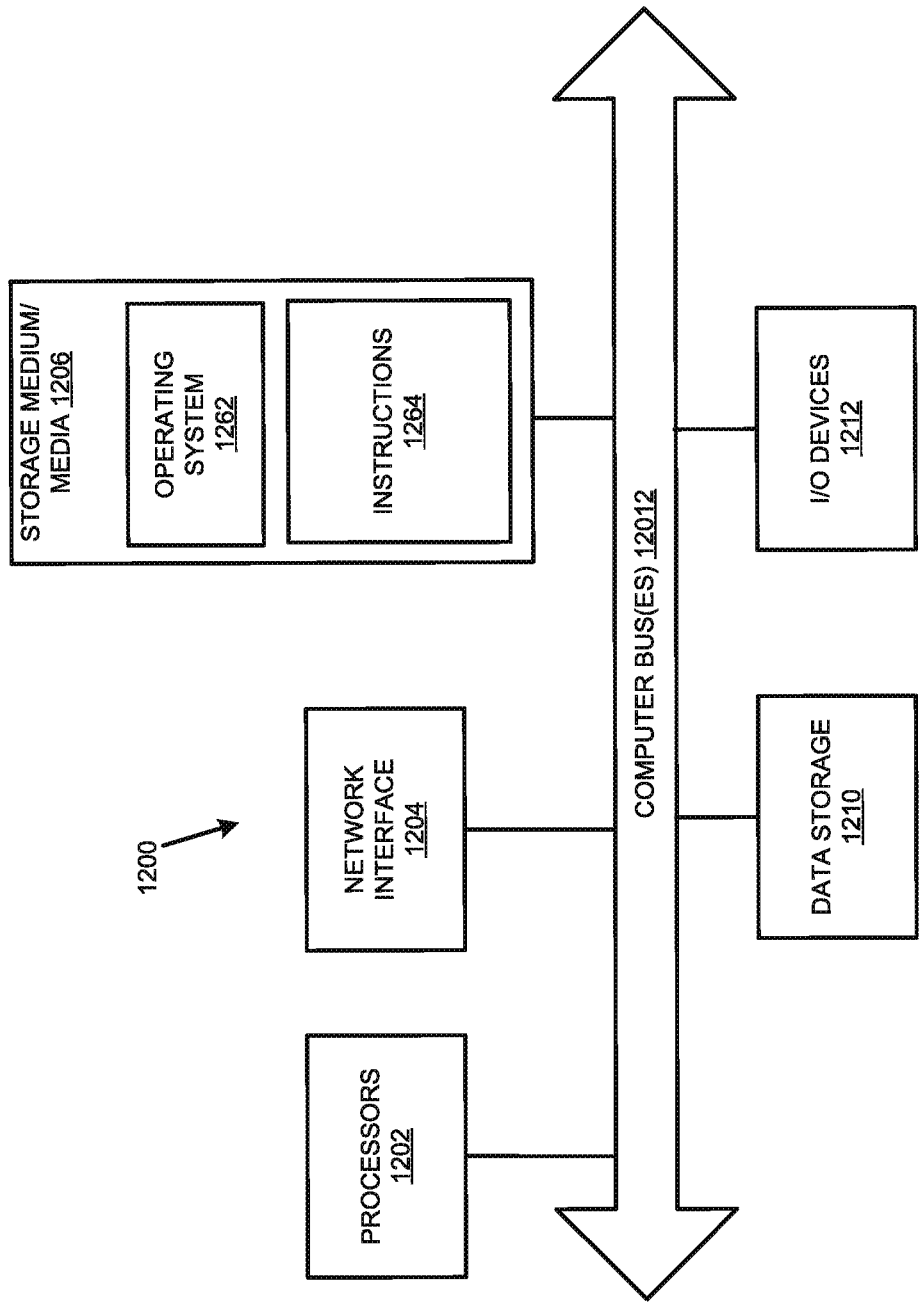
FIG. 12 illustrates a computer system that may be used to implement the smart translation system in accordance with the examples disclosed herein.

FIG. 12 illustrates a computer system 1200 that may be used to implement the smart translation system 100 in accordance with the examples disclosed herein. More particularly, computing machines such as desktops, laptops, smartphones, tablets, and wearables which may be used to generate or access the data from the smart translation system 100 may have the structure of the computer system 1200. The computer system 1200 may include additional components not shown and some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output (I/O) devices 1212, such as a display, mouse keyboard, etc., a network interface 1204, such as a Local Area Network (LAN), a wireless 802.11x LAN, a 3G, 4G or 5G mobile WAN or a WiMax WAN, and a processor-readable medium 1206. Each of these components may be operatively coupled to a bus 12012. The processor-readable or computer-readable medium 1206 may be any suitable medium that participates in providing instructions to the processor(s) 1202 for execution. For example, the processor-readable medium 1206 may be a non-transitory or non-volatile medium, such as a magnetic disk or solid-state non-volatile memory, or a volatile medium such as RAM. The instructions or modules stored on the processor-readable medium 1206 may include machine-readable instructions 1264 executed by the processor(s) 1202 that cause the processor(s) 1202 to perform the methods and functions of the smart translation system 100.

The smart translation system 100 may be implemented as software or machine-readable instructions stored on a non-transitory processor-readable medium and executed by one or more processors 1202. For example, the processor-readable medium 1206 may store an operating system 1262, such as MAC OS, MS WINDOWS, UNIX, or LINUX, and code/instructions 1264 for the smart translation system 100. The operating system 1262 may be multi-user, multiprocessing, multitasking, multithreading, real-time, and the like. For example, during runtime, the operating system 1262 is running and the code for the smart translation system 100 is executed by the processor(s) 1202.

The computer system 1200 may include a data storage 1210, which may include non-volatile data storage. The data storage 1210 stores any data used by the smart translation system 100. The data storage 1210 may be used as a local data storage of the smart translation system 100 to store the input content 152, the translation metadata 154, the translation version 162, the translated content 156, user-selected options, and other data elements which are generated and/or used during the operation of the smart translation system 100.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A smart translation system, comprising:
   at least one application processor;
   a non-transitory processor-readable medium storing machine-readable instructions that cause the application processor to:
   access input content via an application, wherein the input content is to be translated;
   extract translation metadata including a source language of the input content and a target language into which the input content is to be translated;
   determine if translated content corresponding to the input content can be retrieved from a user cache;
   obtain the translated content from the user cache if the translated content of the input content is in the user cache,
      else if the translated content of the input content cannot be retrieved from the user cache,
         determine a type of the application providing the input content, and
         obtain the translated content of the input content from a translation engine automatically selected from a plurality of automatic translation engines, wherein the translated content is generated based on the type of the application;
   enable a display of the translated content of the input content via the application used to display the input content wherein,
      the translated content maintains visible attributes of the input content when displayed through the application.

2. The smart translation system of claim 1, wherein to determine if the translated content of the input content is present in the user cache, the processor is to:
   store prior input content submitted by a user for translation and corresponding translated content along with related translation metadata in the user cache;
   calculate similarity of the input content with the prior input content; and
   provide the translated content from the user cache if the similarity between the prior input content and the input content exceeds a predetermined content similarity threshold.

3. The smart translation system of claim 1, wherein the application includes at least one of an email program, a web browser, and a software application.

4. The smart translation system of claim 3, wherein the application includes the email program and the processor is to further:
   access the input content including at least one of one or more emails and corresponding one or more attachments;
   identify headers and footers separating the one or more emails;
   receive a user selection of the input content to translate; and
   obtain the translated content of the user selection.

5. The smart translation system of claim 4, wherein the user selection includes the corresponding one or more attachments, and to obtain the translated content of the user selection, the processor is to further:
   extract the corresponding one or more attachments from the one or more emails;
   determine an associated file format of each of the corresponding one or more attachments;
   identify digitized textual content of the corresponding one or more attachments; and
   generate a translated file of each of the one or more attachments in the associated file format.

6. The smart translation system of claim 5, wherein the user selection additionally includes the one of one or more emails, and to obtain the translated content of the user selection, the processor is to further:
   obtain a translation of digitized textual content of the one or more emails based on the translation metadata, wherein the translation of the digitized textual content excludes the headers and footers separating the emails; and
   generate the translated content including one or more translated emails corresponding to each of the one or more emails, wherein the one or more translated emails further have attached, the one or more translated files of each of the one or more attachments.

7. The smart translation system of claim 3, wherein the application includes the web browser, and to obtain the translated content of the input content the processor is to further:
   receive the input content including user selection of at least a portion of content displayed by the web browser;
   obtain the translated content of the input content based on the translation metadata; and
   enable a display of the translated content of the input content in the web browser.

8. The smart translation system of claim 7, wherein to obtain the translated content of the input content the processor is to further:
   determine that the portion of the content displayed by the web browser includes an image of text;
   extract the text from the image; and
   obtain a translation of the text extracted from the image.

9. The smart translation system of claim 3, wherein the application includes the software application and the processor is to further:
   receive a user selection of at least a portion of the user interface of the software application; and
   superimpose a context menu of default options automatically selected for the translation metadata on the user selection.

10. The smart translation system of claim 9, wherein to obtain the translated content of the input content the processor is to further:
    extract values of original fields including labels displayed on the portion of the user interface of the software application; and
    obtain translated contents corresponding to each of the values.

11. The smart translation system of claim 1, wherein the default options for the translation metadata are user-editable.

12. The smart translation system of claim 11, wherein to enable the display of the translated content of the input content via an application, the processor is to:
    generate labels including the translated contents for each of the labels with a background of the generated labels being set to match background of the original fields displayed on the portion of the user interface; and
    superimpose the generated labels on the original fields.

13. The smart translation system of claim 1, wherein the translation metadata is extracted manually or automatically.

14. The smart translation system of claim 13, wherein to extract the translation metadata manually, the processor is to:
    receive a user request for the translation metadata; and
    provide a context menu that enables the user to input at least part of the translation metadata.

15. A method of providing an Artificial Intelligence (AI) based translation, comprising:
- receiving input content to be translated;
- extracting translation metadata including a source language of the input content and a target language into which the input content is to be translated;
- determining if translated content of the input content is present in a user cache;
- obtaining the translated content from the user cache if the translated content of the input content is in the user cache,
  - else if the translated content of the input content is not stored in the user cache,
    - extracting a context associated with the input content,
    - automatically selecting a translation engine from a plurality of automatic translation engines based on the context, and
    - obtaining the translated content of the input content from the selected translation engine;
- enabling display of the translated content of the input content via an application used to display the input content,
  - wherein the translated content is displayed through the application with visible attributes similar to that of the input content.

16. The method of claim 15, wherein receiving the input content to be translated, further includes:
- receiving a user selection of content displayed on a user interface (UI) of the application.

17. The method of claim 15, wherein extracting the context of the input content, further includes:
- extracting textual content of the input content;
- obtaining a domain context of the input content by providing the textual content to a machine learning (ML) domain classification model; and
- obtaining a language context of the input content based on the target language.

18. The method of claim 15, wherein obtaining the translated content of the input content from the selected translation engine further comprises:
- parsing and tokenizing the input content;
- identifying sensitive data from the input content based on one or more of n-grams and inference rules; and
- masking the sensitive data from the input content before providing the sensitive data to the selected translation engine for translation.

19. A non-transitory processor-readable storage medium comprising machine-readable instructions that cause a processor to:
- access input content to be translated via an application;
- extract translation metadata including a source language of the input content and a target language into which the input content is to be translated;
- determine if translated content of the input content is present in a user cache;
- obtain the translated content from the user cache if the translated content of the input content is in the user cache,
  - else if the translated content of the input content is not stored in the user cache,
    - determine a type of the application providing the input content, and
    - obtain the translated content of the input content from a translation engine automatically selected from a plurality of automatic translation engines, wherein the translated content is generated based on the type of the application;

and
- enable display of the translated content of the input content via the application used to display the input content wherein,
  - the translated content maintains at least one visible attribute of the input content when displayed through the application.

20. The non-transitory processor-readable storage medium of claim 19, including further instructions that cause the processor to:
- highlight key sections of the translated content in the display; and
- provide a summary of the translated content.

* * * * *